No. 859,859. PATENTED JULY 9, 1907.
M. J. WEAVER.
WAGON BODY.
APPLICATION FILED SEPT. 4, 1906.
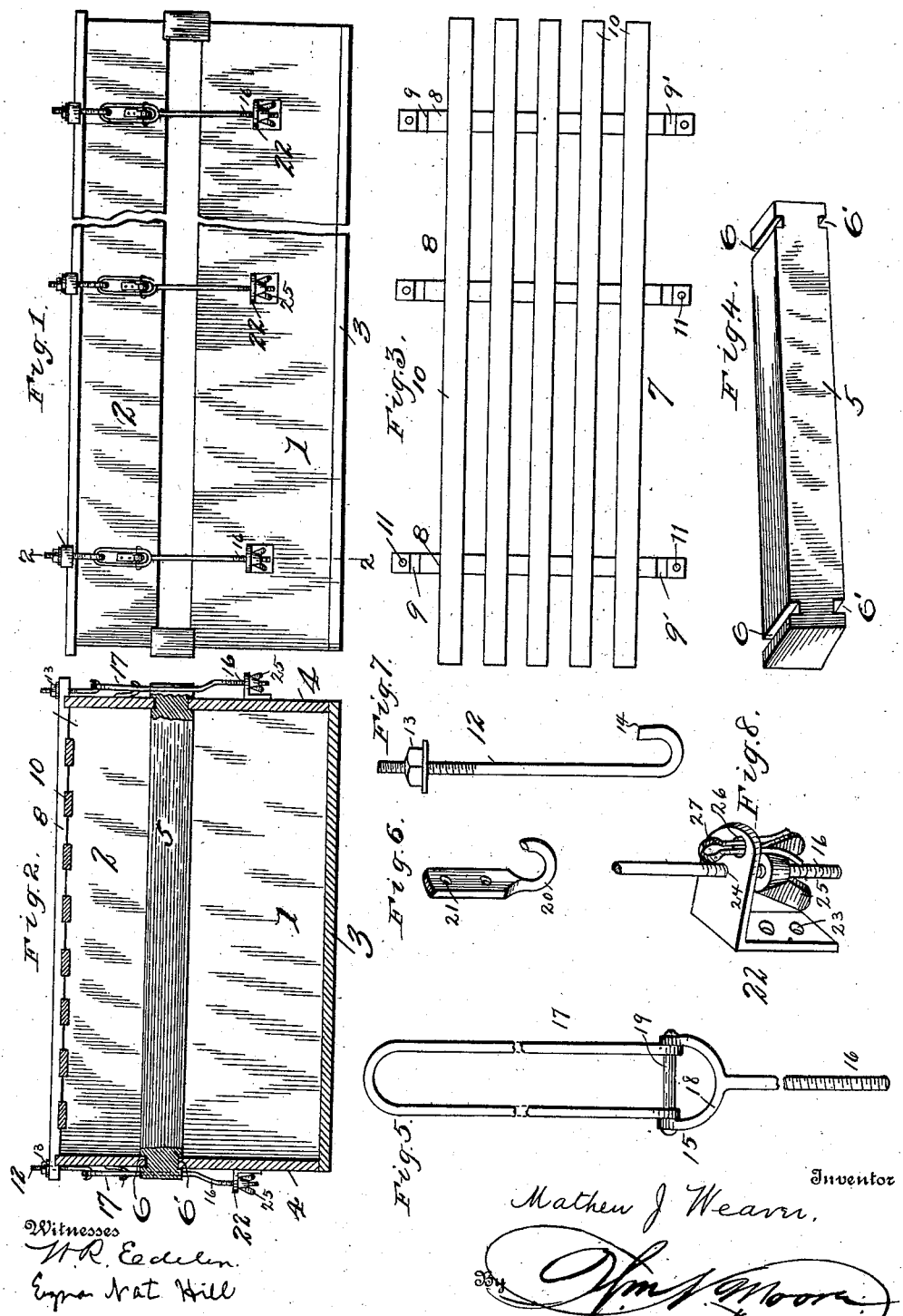

UNITED STATES PATENT OFFICE.

MATHEW J. WEAVER, OF PLATTSBURG, MISSOURI, ASSIGNOR OF ONE-HALF TO JOHN HANSON, OF PLATTSBURG, MISSOURI.

WAGON-BODY.

No. 859,859.     Specification of Letters Patent.     Patented July 9, 1907.

Application filed September 4, 1906. Serial No. 333,107.

*To all whom it may concern:*

Be it known that I, MATHEW J. WEAVER, a citizen of the United States, residing at Plattsburg, in the county of Clinton and State of Missouri, have invented certain new and useful Improvements in Wagon-Bodies, of which the following is a specification.

The present invention relates to improvements in wagon bodies, and has for its objects the provision of a sectional wagon body and means for securing the sections together.

By my construction I provide a wagon body adapted to be used for hauling grain etc, and when so used is entirely closed to prevent spilling of the contents of the wagon bed; and the wagon body may be further adapted for use in hauling hogs, sheep, poultry etc, by separating the sections of the wagon body in order to provide ventilation therein, as will be further described.

The invention consists essentially in a wagon body comprised of a plurality of sections and means whereby said sections may be held in position separated from each other, and it further consists in certain novel features of construction and combinations and arrangements of parts as will be hereinafter set forth and claimed.

In the accompanying drawings I have illustrated one example of the physical embodiment of my invention, constructed according to the best mode I have so far devised for the practical application of the principles. Figure 1 is a side view in elevation of the wagon body or bed, showing the sections separated, the upper section being raised above the lower section. Fig. 2 is a transverse section of the wagon bed shown in Fig. 1. Fig. 3 is a top plan view of a slatted cover for the wagon body, to be used when hauling live animals. Fig. 4 is a perspective view of one of a pair of spacing bars, to be located transversely of the wagon, for holding the sections in separated position. Fig. 5 is an elevation view of a combined loop and bar, used for securing the wagon body sections together. Fig. 6 is a perspective view of a fastening hook permanently secured to one of the sections of the wagon body. Fig. 7 is a view of a threaded bolt having a hooked end, employed for fastening the slatted cover or top portion of the wagon body to the body proper, and Fig. 8 is an enlarged detail perspective view of a part of the fastening means, a portion of which is permanently secured to the lower wagon section.

Referring to the drawings, the numeral 1 designates the lower wagon body section as a whole; 2, the upper section as a whole; 3, the bottom of the wagon; 4, 4, the sides of the lower section of the body; 5, 5, spacing bars; 6, 6', upper and lower grooves cut out of the bars, one pair at each end of the bar, said grooves being adapted to receive the lower edges of the sides of the upper section 2 and the upper edges of the sides 4 of the lower section respectively; 7, the slatted cover or top; 8, a series of transverse bars forming a portion of the top; 9, 9' pairs of grooves located on the under side of the cross bars, one groove of each pair at each end of the bars; 10, slats secured in any suitable manner to the cross bars; 11, holes in the cross bars, located near their ends; 12, threaded bolts passed through said holes; 13, nuts on the bolts; 14, the hooked end of bolt 12; 15, the combined looped-bar having a lower threaded end 16, an upper looped end 17, a fork 18, and a hinge or pivot 19; 20, a hook provided with a flatted portion 21, and said portion 21 being perforated for the passage of bolts or other securing devices, by which the hook is permanently attached to the upper section of the wagon body; 22, an angle iron having suitable perforations 23 for bolts by means of which latter the angle iron is permanently secured to the lower wagon body section; 24, a hole or opening in the horizontal arm of the angle iron to pass the threaded end 16 of the looped bar 15; 25, a winged nut threaded onto the bar 16, adapted to bear against the under surface of one arm of the angle iron; 26, an opening in the horizontal arm of the angle iron; and 27, is a cotter pin passed through the opening 26 and having its legs spread apart to embrace the winged nut 25 to prevent the same from turning.

It will be understood that the lower section 1 of the wagon body may be of any usual construction and the fastening means employed by me may be secured to a wagon of ordinary construction in present use, or to an especially designed body. The angle irons are permanently secured to the lower section of the body, and the hooks 20 are permanently attached to the upper section, in line with the angle iron on the lower section.

As illustrated in the drawings, the wagon is ready for use in hauling live animals, the two cross bars or space bars being located between the upper and lower wagon sections providing a space, as 28 for ventilation, and the passage of air. As clearly shown in the drawings, the slatted cover is held down to the top of the upper section by means of the connection between the hook 14 and loop 17, the nut 13 serving to clamp the connection. The upper and lower sections are held together by means of the pivot bar 19 which is seated in the hook 20, said hook as before stated being permanently attached to the upper wagon section, and this connection is clamped by means of the winged nut 25, which is locked against turning by means of the cotter pin 27.

When in use for hauling live animals as described, the two wagon sections, the slatted cover, and the two cross or space bars are firmly held together by means of the fastening devices as described.

When it is desired to haul grain or the like in the wagon, the space bars are dispensed with, and the upper section of the body is placed directly upon the lower section, and if the slatted cover is desired the same may remain and the fastening be made by turning the winged nuts, or if the slatted cover is not desired the upper section may be held to the lower section by means of the connection between the pivot bar 19 and hook 20, and adjustment secured by the winged nut. The number of fastening bolts and hooks to be used will depend upon the size of the wagon, but a sufficient number will be present to secure a strong and rigid structure.

From the above description taken in connection with the drawings it is evident that I have produced a structure which fulfils all the objects set forth as the purpose of my invention.

Having thus fully described the invention, what I claim as new and desire to secure by Letters Patent is:

1. The combination with a sectional wagon body, of space bars provided with transverse grooves on their upper and lower surfaces for the reception of the sides of said sections.

2. The combination with a wagon body composed of a plurality of sections, and means for spacing said sections apart, of a slatted cover therefor; a hooked threaded bar secured to the slatted cover, a permanent hook on one of the sections and an anchor on another of the sections, a looped bar having a threaded end connected with said anchor and its loop connected to the hooked bar of the slatted cover, and a hinged joint between the loop portion and threaded bar, which hinged joint is hung over the permanent hook on one of the sections.

3. A device for the purpose described consisting of a looped threaded bar having a hinged joint, a perforated anchor for said bar and a nut on the bar bearing against said anchor, a permanent hook over which the hinged joint is adapted to hang, and a hooked threaded bar provided with a nut, said hooked bar adapted to receive the loop of the first mentioned threaded bar.

In testimony whereof I affix my signature in presence of two witnesses.

MATHEW J. WEAVER.

Two witnesses:
ROBERT L. EBERTS,
FRANK B. ELLIS.